A. N. NEWTON.
Breech-Loading Fire-Arm.
No. 145 A. I. Patented June 17, 1856
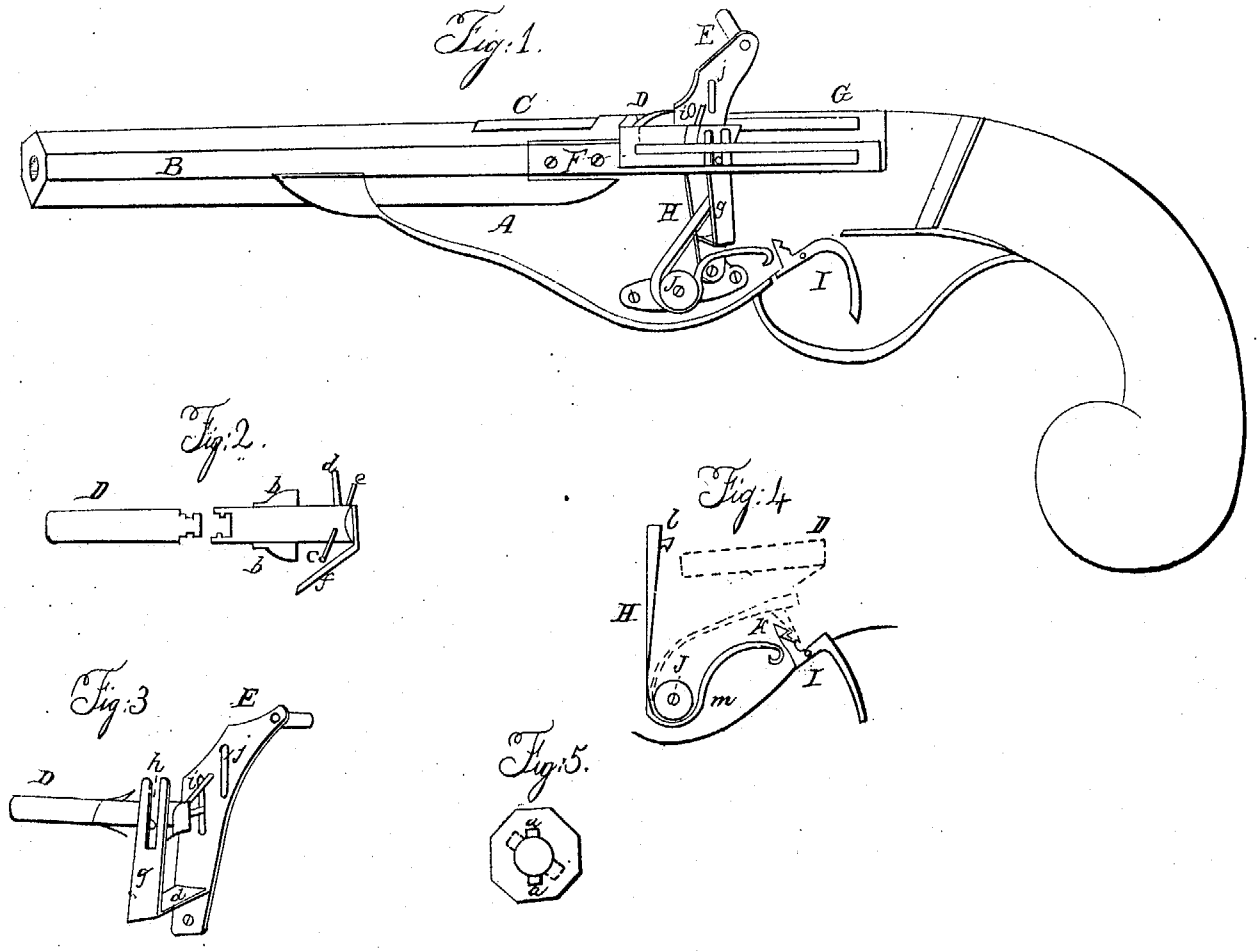
N. PETERS, PHOTO-LITHOGRAPHER, WASHINGTON, D. C.

UNITED STATES PATENT OFFICE.

ABNER N. NEWTON, OF RICHMOND, INDIANA.

IMPROVEMENT IN BREECH-LOADING FIRE-ARMS.

Specification forming part of Letters Patent No. 11,198, dated June 27, 1854; Additional Improvement No. 145, dated June 17, 1856.

*To all whom it may concern:*

Be it known that I, ABNER N. NEWTON, of Richmond, of the county of Wayne and State of Indiana, have invented certain new and useful Improvements in Breech-Loading Fire-Arms; and I do hereby declare that the following is a full, clear, and exact description of the construction and operation of the same, reference being had to the accompanying drawings, and to the letters of reference marked thereon.

I use a shank, A, Figure 1, similar to my fire-arm patented June 27, 1854, in which the barrel B is firmly secured in any proper manner. In the rear of the barrel there is a long mortise or opening, C, for the reception of the charge. This portion of the barrel is also enlarged for the reception of the breech-pin D. At the extreme breech end of the barrel there are two short grooves, *a a*, Fig. 5, for the passage of the lugs *b b* of the breech-pin.

The breech-pin D, Fig. 2, is of cylindrical form. It has two parts, which are connected by a rotary or swivel joint. These parts are shown slightly separated in the drawings the better to delineate their parts. It has also the studs *c d e* near its rear, the inclined plane *f*, and the lugs *b b*.

E is a thumb-lever, by means of which the breech-pin D receives a sliding and rotary motion. It has an arm, *g*, which receives the stud *c* of the breech-pin in its slot *h* during the horizontal motion of said breech-pin. The thumb-lever E has also in its body the slots *i* and *j*. Its foot may be secured in any way that will admit of free lateral motion. The slot *i* receives the stud *e* in its embrace, by means of which it assists in imparting to the breech-pin its sliding motion. The slots *i j*, in combination with the studs *d e*, impart to the breech-pin its rotary motion in locking and unlocking.

The slides F and G are nearly similar to those of the old invention; but the slide F has an opening in its anterior superior side, and the slide G has a similar one on its anterior inferior side. These openings are severally for the passage or escape of the studs *c* and *e* in the process of locking.

H, Fig. 4, is a substitute for four pieces in the ordinary gun-lock—viz., the hammer, mainspring, tumbler, and feather-spring. Its shape is indicated in the drawings. The trigger I has a catch, *k*, at its upper end that clutches a similar catch, *l*, upon H in cocking, thus answering the double purpose of trigger and dog or sear.

Fig. 5 is a section of the barrel immediately at the rear of the mortise C, showing the manner in which the lugs of the breech-pin pass the slots *a a* and effect a secure locking. The surfaces upon which these lugs lock should be slightly inclined in such a manner as completely to wedge the front end of the breech-pin into its seat.

J is a drum, Fig. 4, around which the part H is partially coiled, and is retained in its proper place by a stud or lip, *m*, stationed a sufficient distance to the right to allow the spring to set in between it and the drum, thereby securing the tension of the spring.

In this improvement the hammer and tumbler combined and working loosely on an arbor may be used, as patented by me June 27, 1854; also, the ordinary mainspring and trigger, the percussion rod or needle being the same.

The breech-pin D in this case may be in one piece, without a joint; but I think the swivel-jointed breech possesses some advantages over the solid one, as when the breech should from any cause stick fast in the chamber the rear or swivel piece of the breech could be more easily rotated than if the whole had to be rotated.

The invention is operated thus: After firing, the thumb is placed upon the stud at the upper end of the lever E, to which it gives a backward motion, as in cocking an ordinary gun. The first effect of this motion is a rotation of the breech-pin to the left, thereby freeing the lugs of said pin from the rear end of the barrel. The breech-pin now recedes, so as to leave the mortise C entirely free for the reception of the cartridge. At the same time the inclined plane *f* acts upon the cock, forcing it backward and downward till the catch *l* is clutched by the catch *k* of the trigger. The cartridge is now introduced, and a forward motion of the lever E forces it home, after which a continuation of the motion of the lever produces a reversed rotation of the breech-pin, thereby securely locking the same. If it is wished to fire immediately, a touch of the trigger is all that is necessary, as the gun is already cocked; otherwise the cock may be eased down, as in the ordinary gun.

What I claim as my invention, and desire to secure by Letters Patent, is—

1. A swivel-jointed cylindrical breech-pin, D, the rear portion of which is armed with lugs *b b* and studs *c d e*, and an inclined plane, *f*, all operating in the manner and for the purpose as herein specified.

2. The locking of the cylindrical breech-pin D by means of lugs *b b* on said breech-pin rotating on slightly-inclined planes, said planes formed within the barrel on opposite sides and at the rear of the mortise C, or their equivalents, substantially as set forth.

3. The peculiar combination and arrangement of the four parts or pieces of an ordinary gun-lock—to wit, the hammer, mainspring, tumbler, and feather-spring—making one plain simple piece, operating as above represented.

4. The slotted thumb-lever E, in combination with the studs *c d e*, whereby the swiveled breech is caused to rotate from left to right and from right to left in locking and unlocking said breech, and whereby the breech is also moved back and forth, substantially as above described.

ABNER N. NEWTON.

In presence of—
JOHN FINLEY,
GEO. TAYLOR.